UNITED STATES PATENT OFFICE.

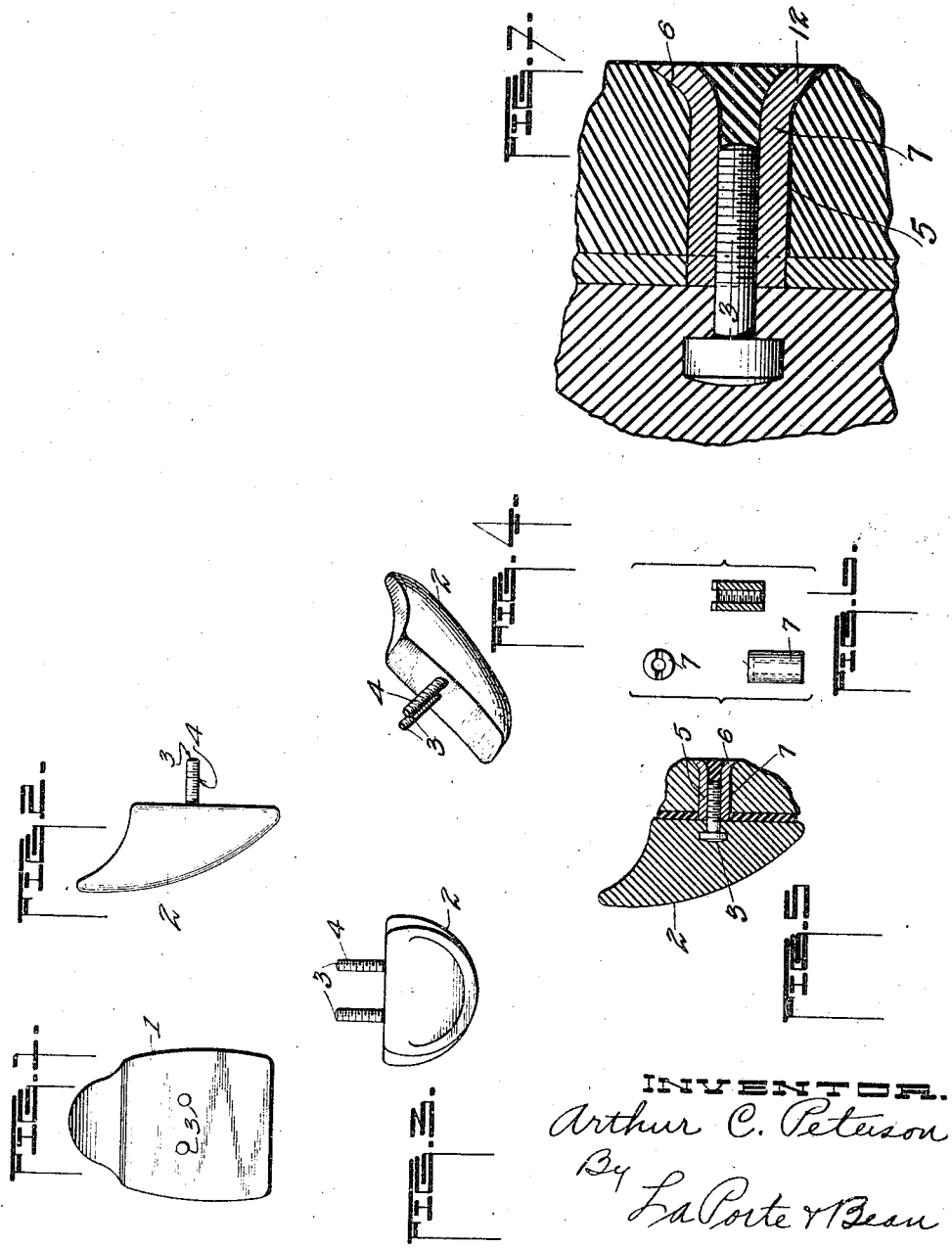

ARTHUR C. PETERSON, OF PEORIA, ILLINOIS.

TOOTH.

1,285,360.  Specification of Letters Patent.  Patented Nov. 19, 1918.

Application filed May 11, 1917. Serial No. 167,928.

*To all whom it may concern:*

Be it known that I, ARTHUR C. PETERSON, a citizen of the United States, a resident of Peoria, in the county of Peoria and State of Illinois, have invented new and useful Improvements in Teeth, of which the following is a specification.

This invention relates to improvements in artificial teeth and more particularly to a method and means of repairing artificial teeth and especially single porcelain crowns with backings or teeth broken from bridge work.

The principal object is the provision of a method and means whereby a broken crown or a broken bridge may be readily and quickly and securely repaired with minimum inconvenience to the patient and operator, and in a comparatively short period of time.

To the accomplishment of the foregoing and such other objects as may hereinafter appear, my invention consists in the combination, construction and arrangement of parts hereinafter described and then sought to be defined in the appended claims, reference being had to the accompanying drawings forming a part hereof, and which show merely for the purpose of illustrative disclosure, a preferred embodiment of my invention, it being understood that various changes may be made in practice within the scope of the claims without digressing from my inventive idea.

In the drawings,

Figure 1 represents a rear elevation of an ordinary facing;

Fig. 2 is a side elevation thereof, showing the pins threaded;

Fig. 3 is an end elevation thereof showing the pins threaded;

Fig. 4 is a perspective view thereof, showing the pins threaded;

Fig. 5 is a cross section through an assembled facing, repaired according to my method and utilizing my improved means;

Fig. 6 embodies a top plan, side elevation and longitudinal cross sectional view, respectively, of an assembling sleeve;

Fig. 7 is an enlarged cross section showing the assembled repaired facing;

Fig. 8 is an elevational view of a tool used in this method, and

Fig. 9 is a view showing the compression forceps and the method of securing the parts in position.

In dentistry, it is often necessary to replace broken porcelain crowns and teeth which have been broken from bridges. This operation is quite complicated and expensive, and requires considerable time. It is my purpose to reduce the amount of time required for this operation and also to reduce the expense of the operation, and to provide a secure attachment for the repair part, so that the repaired tooth will give satisfactory service.

In carrying out my method, I utilize the ordinary form of tooth or facing designated 1, having the body 2 and the plurality of securing pins 3. These pins are first threaded as indicated at 4. If any porcelain or other material from the broken tooth remains on the backing and solder, it is removed. An aperture or hole 5 is then drilled through the backing and solder and is flared or countersunk at its outer end as at 6.

The securing or assembling sleeve 7, which is internally screw-threaded, is screwed on to the threaded stem 4 of the supporting pin 3 by means of some suitable tool; the tooth with the assembling sleeve is then placed against the backing with the sleeve in the aperture 5. Then the tool, which is used, is applied so as to force the outer end 12 of the sleeve 7 into the countersunk or flared portion 6 of the aperture 5, as clearly shown in Fig. 7, thereby securely locking the parts together. If desired, the aperture leading into the sleeve 7 may be filled with a suitable alloy filling.

What I claim is:

1. The method of repairing artificial teeth which includes connecting an assembling sleeve to the securing pin of a tooth, forming an aperture through the backing and solder, positioning the sleeve in said aperture, and locking the sleeve to the backing and solder by flaring the outer end of the sleeve.

2. The method of repairing artificial teeth, which includes threading the supporting pin of the tooth, securing an internally threaded assembling sleeve on said supporting pin, forming an aperture through the backing, positioning said sleeve in the backing and then locking said sleeve within the aperture so as to secure the parts together.

3. A tooth including in combination, a body having a supporting pin screw-threaded, a backing, a solder backing, said backing and solder having an aperture therethrough, an internally screw-threaded assembling sleeve positioned in said aperture and engaging said threaded pin, the outer end of said assembling sleeve being flared to lock the parts together.

4. The method of repairing an artificial tooth, which consists in securing an assembling sleeve to the pin of the artificial tooth, and locking said sleeve to the backing by flaring the outer end of the sleeve.

ARTHUR C. PETERSON.

Copies of this patent may be obtained for five cents each, by addressing the "Commissioner of Patents, Washington, D. C."